United States Patent [19]
Ramsden et al.

[11] Patent Number: 5,619,854
[45] Date of Patent: Apr. 15, 1997

[54] TURBOCHARGED INTERNAL COMBUSTION ENGINE

[75] Inventors: John N. Ramsden, Suffolk; Ian W. Drake, Essex, both of England

[73] Assignee: GEC Alsthom Diesels, Ltd., Newton Le Willows, United Kingdom

[21] Appl. No.: 630,788

[22] Filed: Apr. 10, 1996

Related U.S. Application Data

[63] Continuation of Ser. No. 248,876, May 25, 1994, abandoned.

[51] Int. Cl.⁶ .................................................... F02B 37/00
[52] U.S. Cl. ........................................................ 60/612
[58] Field of Search ................................................ 60/612

[56] References Cited

U.S. PATENT DOCUMENTS

| | | |
|---|---|---|
| 4,032,262 | 6/1977 | Zehnder . |
| 4,196,593 | 4/1980 | Froeliger . |
| 4,400,945 | 8/1983 | Deutschmann et al. . |
| 5,109,674 | 5/1992 | Sudmanns ................... 60/612 |

FOREIGN PATENT DOCUMENTS

| | | | |
|---|---|---|---|
| 55-109726 | 8/1980 | Japan .................... | 60/612 |
| 437078 | 10/1935 | United Kingdom . | |
| 1551833 | 9/1979 | United Kingdom ........ | 60/612 |

OTHER PUBLICATIONS

"Sequential Turbocharging of the MTU 1163 Engine", Institute of Marine Engineers, Mar. 1, 1988.
"Shipbuilding and Marine Engineering International", Apr. 1977, p. 171.
"Development of Two-Stage Turbocharging System on a Four Stroke Medium Speed Diesel Engine", CIMAC, 1977.
"Turbocharging Tomorrow", Diesel Engineering, Spring 1977, pp. 15–16.
"Turbocharging the Internal Combustion Engine", N. Watson et a., MacMillan Education Limited, ISBNO–333–24290–4, Chapter 2.
Datasheet code RR1–3–002, by ABB Turbosystems Ltd.
"Challenger Enters High-Speed Arena", The Motorship, Jun. 1993, pp. 66, Jun. 8, 1993.
"New High Performance Compact Engine From Paxman", Diesel and Gas Turbine Worldwide, Jun. 1993, p. 40, Jun. 9, 1993.
"High Speed Variety: Paxmans New High Performing 12VP185", LSM, Aug. 1993, p. 53.
"The Design and Development of a New High-Speed Diesel Engine", Sydney, Australia, Nov. 8, 1993.

*Primary Examiner*—Michael Koczo
*Attorney, Agent, or Firm*—Donald C. Casey, Esq.

[57] ABSTRACT

A turbocharged diesel engine having a two stage turbocharger assembly is described. The assembly includes two low pressure turbochargers coupled in parallel and arranged in series with a single high pressure turbocharger. This allows all turbochargers to be of comparable dimensions and allows for interchangeability of parts between low pressure and high pressure turbochargers. The turbochargers may be mounted on an enclosure which encloses the turbines and the exhaust gas ductwork and which communicates with the exhaust pipe to insure that any leaking exhaust gas escapes to the atmosphere via the exhaust pipe.

8 Claims, 6 Drawing Sheets

TURBOCHARGED INTERNAL COMBUSTION ENGINE

This application is a continuation of application Ser. No. 08/248,876 filed May 25, 1994, abandoned.

BACKGROUND OF THE INVENTION

This invention relates to supercharged internal combustion engines.

The practice of supercharging internal combustion engines by means of turbochargers to improve their power output is well known in the art.

Each turbocharger normally comprises a turbine rotor and a compressor rotor mounted coaxially on the same shaft, the turbine being driven by the energy present in the exhaust gases from the reciprocating internal combustion engine and the compressor serving to compress air for delivery to the engine.

In one particular type of turbocharger, employed in an embodiment of the invention to be described later, there are three major functional sections. The central section consists of a housing which carries the bearing system for supporting a rotor consisting of a shaft with, at one end a centrifugal compressor impeller, and at the other end the rotor of a radial-flow turbine. The compressor end of the bearing housing carries a circular flange to which is attached the compressor casing of the centrifugal compressor.

At the opposite end of the bearing housing there is associated with the turbine rotor a turbine casing into which exhaust gas is conducted from the engine. The casing serves to shape the flow of the hot gases before their expansion through the turbine rotor.

The gases entering the turbine casing are generally hot, with temperatures up 700° C. not being uncommon, and it is therefore an advantage to the bearings if the turbine casing can be supported as independently as possible of the bearing housing, thereby to reduce heat flow from the turbine casing into the bearing housing.

The bearing housing requires a supply of cool oil to lubricate the bearings supporting the rotor and a drain means to take the used oil away.

A conventional method of support for turbochargers is to support a turbocharger via a flange attached to the inlet of the turbine casing. Whilst this may be simple it means that a considerable dead load is applied to the exhaust ducting which conveys the exhaust gases from the engine to the turbocharger.

it is also known to support turbochargers via a flange attached to the outlet of the turbine housing, which gives rise to similar problems regarding deadload. It is also known to support turbochargers by a support bracket coupled to the central section.

For single-stage turbocharging it may be sufficient to use a single supercharger. For larger engines, in particular those having two rows of cylinders, each row of cylinders may be provided with its own supercharger. An example of such an arrangement is disclosed in United Kingdom Patent GB437078.

The pressure ratio obtainable by a single stage turbocharger is somewhat limited, and for higher performance, multiple stage turbocharging has been employed, the required degree of compression being provided by disposing a high pressure turbocharger in series with a low pressure turbocharger. Exhaust gas from the engine first passes through the turbine of the high pressure turbocharger and then passes through the turbine of the low pressure turbocharger. Similarly, air at atmospheric pressure is first compressed in the low pressure compressor and is then further compressed in the high pressure compressor.

However, this does give rise to problems. The turbines get very hot in use and as a consequence their turbine casings and associated exhaust duct work are subject to thermal expansion when starting from cold. This gives rise to problems in maintaining the exhaust duct work gas-tight. This can be a problem where engines are installed in confined spaces such as ships or basements of buildings.

To overcome the problems of exhaust gas leakage it has been proposed to construct a two-stage turbocharger with a unitary combined casing for the high and low pressure turbines. Such arrangements are disclosed in U.S. Pat. No. 4,032,262 (Zehnder), and U.S. Pat. No. 4,196,593 (Froeliger) and involve the provision of a unitary casing for the high and low pressure turbocharger.

Where two-stage turbocharging is applied to large engines, the low pressure turbocharger may prove to be physically large such that mounting on the engine is not practical. The low pressure turbocharger then has to be mounted off the engine and coupled thereto by ducting. Such an arrangement is disclosed in the publication "Shipbuilding and Marine Engineering International" April 1977, page 171 and the article "Development of two-stage turbocharging system on a four stroke medium speed diesel engine" CIMAC, 12th International Congress on Combustion Engine, Tokyo, 1977, paper A7, FIG. 16. Such arrangements require considerable headroom and present difficulties where an engine is to be installed in a confined space having limited headroom.

It is sometimes the practice not to cool the turbine casings, inter alia because condensation of combustion products on a cooled turbine casing has been found to lead to corrosion and consequent reduction in service life. This is exacerbated the problems of thermal expansion. Further, the elimination of cooling from the turbine housing leads to increased heat loss from the engine. This can be a problem in confined spaces.

An alternative method of supporting the turbocharger is known from U.S. Pat. No. 4,400,945 (Deutschmann).

U.S. Pat. No. 4,400,945 (Deutschmann) provides a housing to which turbochargers are mounted such that the turbines and their associated conduits are disposed within the housing, while the compressors and their associated conduits are outside the housing. The housing may be sealed to prevent escape of any exhaust gas which might leak pass the joints in the exhaust conduits.

Deutschmann teaches to arrange the bearing housing to be supported by a box-like enclosure surrounding the turbine casing. The enclosure is split along a plane passing through the centre-line of the bearing housing, and the two halves of the enclosure are arranged to tighten down onto the bearing housing, this being achieved by arranging the bearing housing to be of cylindrical shape, and the wall of the enclosure to have an accommodating circular hole equally displaced about the split-line. If the enclosure's grip on the turbocharger is to be secure and stable, then the bearing housing diameter and the internal diameter of the hole in the enclosure have to be manufactured to fine limits. With this arrangement, the turbocharger can only be removed by dismantling the enclosure to some degree, and, where a sealed housing is employed, the joints between the two halves of the housing along the dividing plane and around the turbochargers have to be re-sealed, and the connections between the top of the housing and any other components, such as the exhaust pipe, which had to be disconnected before the top of the housing could be removed, must be re-connected and re-sealed.

Deutschmann also mitigates the problem of headroom by the provision of a relatively large number of individual relatively small turbochargers or two-stage turbocharger assemblies rather than one or two relatively large turbochargers. However, the low pressure turbochargers of Deutschmann's two-stage turbochargers are physically larger than their associated high pressure turbochargers.

SUMMARY OF THE INVENTION

In accordance with a first aspect of the invention a supercharged internal combustion engine comprises two-stage turbocharger means in which said two-stage turbocharger means comprises a high pressure turbocharger and a plurality of low pressure turbochargers, each said turbocharger comprising a compressor and a turbine, each compressor comprising an impeller and a compressor housing having an input port and an output port, each turbine comprising a turbine rotor, and a turbine housing having an input port and an output port, and exhaust gas conduit means adapted to couple the output port of the high pressure turbine to the input ports of the low pressure turbines in parallel.

This aspect of the invention can avoid the need to provide a low-pressure turbine of greater dimensions than the high pressure turbid. Each low-pressure turbine can be arranged to be driven by half the exhaust gas which drives the high pressure turbine and hence the low-pressure turbine housings may be the overall height requirement for comparable size with the high pressure turbine. Thus the overall height requirement for the turbines may be that of the high-pressure turbine.

According to a second aspect of the invention a super-charged internal combustion engine comprises two-stage turbocharger means in which said two-stage turbocharger means comprises a high pressure turbocharger and a plurality of low pressure turbochargers, each said turbocharger comprising a compressor and a turbine, each compressor comprising an impeller and a compressor housing having an input port and an output port, each turbine comprising a turbine rotor, and a turbine housing having an input port and an output port, and air conduit means adapted to couple the output ports of the low pressure compressors in parallel to the input port of the high pressure compressor.

This aspect of the invention can avoid the need to provide a low-pressure compressor of greater dimensions than that of the high pressure compressor. Again, each low-pressure compressor can be arranged to supply half the air required by the high-pressure compressor, and thus the low pressure compressors may be comparable in size with the high pressure compressor. Thus the overall height requirement for the compressors may be that of the high pressure compressor.

According to a further aspect of the invention, a supercharged internal combustion engine comprises an exhaust duct work, a turbocharger, comprising a compressor and a turbine, mounted independently of the exhaust duct work, a connection between the exhaust duct work and an input port of the turbine which allows for relative movement of the turbine and exhaust duct work due to-thermal expansion and contraction, an exhaust conduit downstream of the turbocharger, a connection between an output port of the turbine and the exhaust conduit, an enclosure around the turbine adapted to separate the turbine thermally from the compressor and a path between the enclosure and the exhaust pipe whereby any exhaust gas leakage from the said connection allowing expansion and contraction is routed in to the exhaust pipe.

This aspect of the invention can address the problem of leakage from the joints in the exhaust duct work by providing a box to contain the leaking gases. Providing a path for escape of such leaking gas to the exhaust pipe can avoid the need for the joints and seals of the enclosure to withstand high pressures and thereby reduces the possibility of gases escaping from the enclosure into the vicinity of the engine, Another aspect of the invention provides a supercharged internal combustion engine comprising a turbocharger, said turbocharger comprising a turbine and compressor, said turbine comprising a turbine housing and a turbine rotor, said compressor comprising a compressor housing and a compressor impeller, said turbocharger having a housing comprising said turbine housing and said compressor housing, further comprising support means adapted to support said turbocharger, in which said support means comprises a portion disposed intermediate said turbine and compressor, said portion having a respective first face and second face arranged parallel to and spaced apart from said first face such that said portion intermediate said first and second faces constitutes a portion of said turbocharger housing.

This aspect of the invention can allow one to provide a good thermal contact between the turbine housing and the support means which provide a shunt path for heat, which shunt path can help to keep the turbocharger bearings cool. It can also provide a secure mounting for the turbocharger which is relatively easy to keep gas-tight and which avoids the need for a precision bore of high tolerance to be provided in the support means. It can also provide for easy assembly and removal of the turbocharger in service which can avoid the need for excessive dismantling of the engine and its ancillary components.

Yet a further aspect of the invention provides a supercharged internal combustion engine comprising a turbocharger, said turbocharger comprising a turbine housing, a compressor housing, and a cartridge comprising a shaft and bearings for said shaft, said shaft carrying a turbine rotor and a compressor impeller, a wall adapted to support said turbocharger on said engine, said wall having a first side and a second side opposite said first side and an aperture extending through said wall between said first and second sides wherein said turbine housing is adapted to be secured to said first side about said aperture, said cartridge being designed so that, during assembly, it can be inserted through said aperture thereby aligning said turbine rotor within said turbine housing and said cartridge being adapted to be secured to said second side about said aperture, said compressor housing being adapted to be secured to said cartridge to align said compressor impeller with said compressor housing.

This can provide an arrangement which simplifies the assembly and replacement of a turbocharger in service and which can avoid the need to provide a precision bore of high tolerance in the wall.

DETAILED DESCRIPTION

Figure 1:
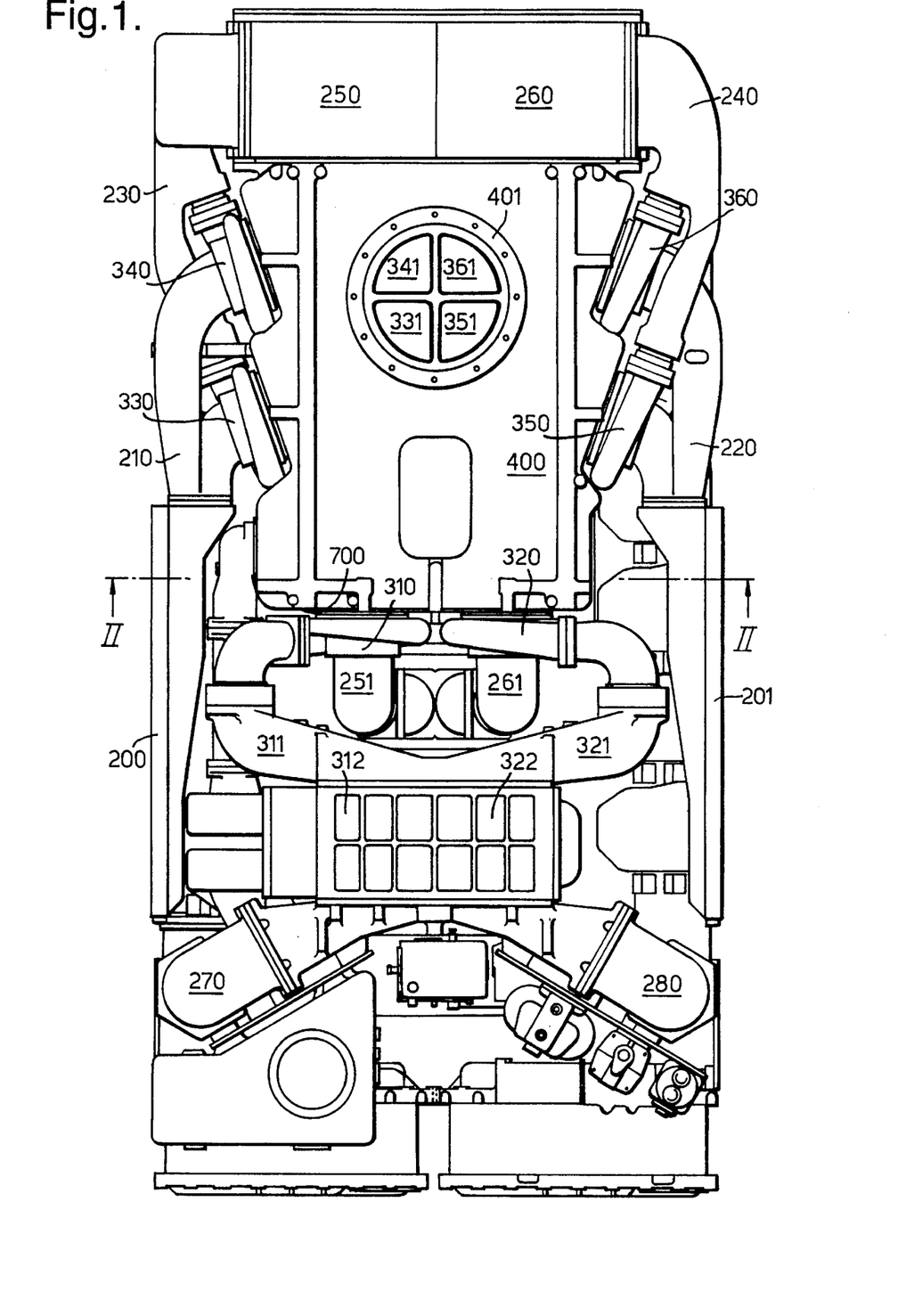
FIG. 1 shows a plan view of an engine in accordance with the invention.

In FIG. 1 air inlet ports 200, 201 are connected, via conduits 210, 220 to the inlet ports of respective pairs of low-pressure compressors 330, 340 and 350, 360. The pairs of compressors are mounted on the outer surfaces of side walls of an enclosure 400. The compressors are driven by turbines disposed within housing 400 as will be described later. The output ports of the compressors 330, 340 and 350, 360 are respectively connected via in parallel by respective ducts 230, 240 to respective intercoolers 250, 260. The cooled air is fed over ducts 251, 261 to respective inputs of high pressure compressors 310, 320 mounted on an outer end wall of enclosure 400. The output ports of the high pressure compressors 310, 320 are coupled via ducts 311, 321 to respective aftercoolers 312, 322. The outputs of the aftercoolers 312, 322 are connected via conduits 270, 280 to respective inlet manifolds, not shown. Enclosure 400 has a flange 401 adapted to receive an exhaust pipe, not shown, for conveying exhaust gas to the atmosphere as will be described later. Exhaust gas from the turbines disposed within enclosure 400 is fed into the exhaust pipe via respective trumpets 331, 341, 351, 361 as will be described later.

Figure 2:
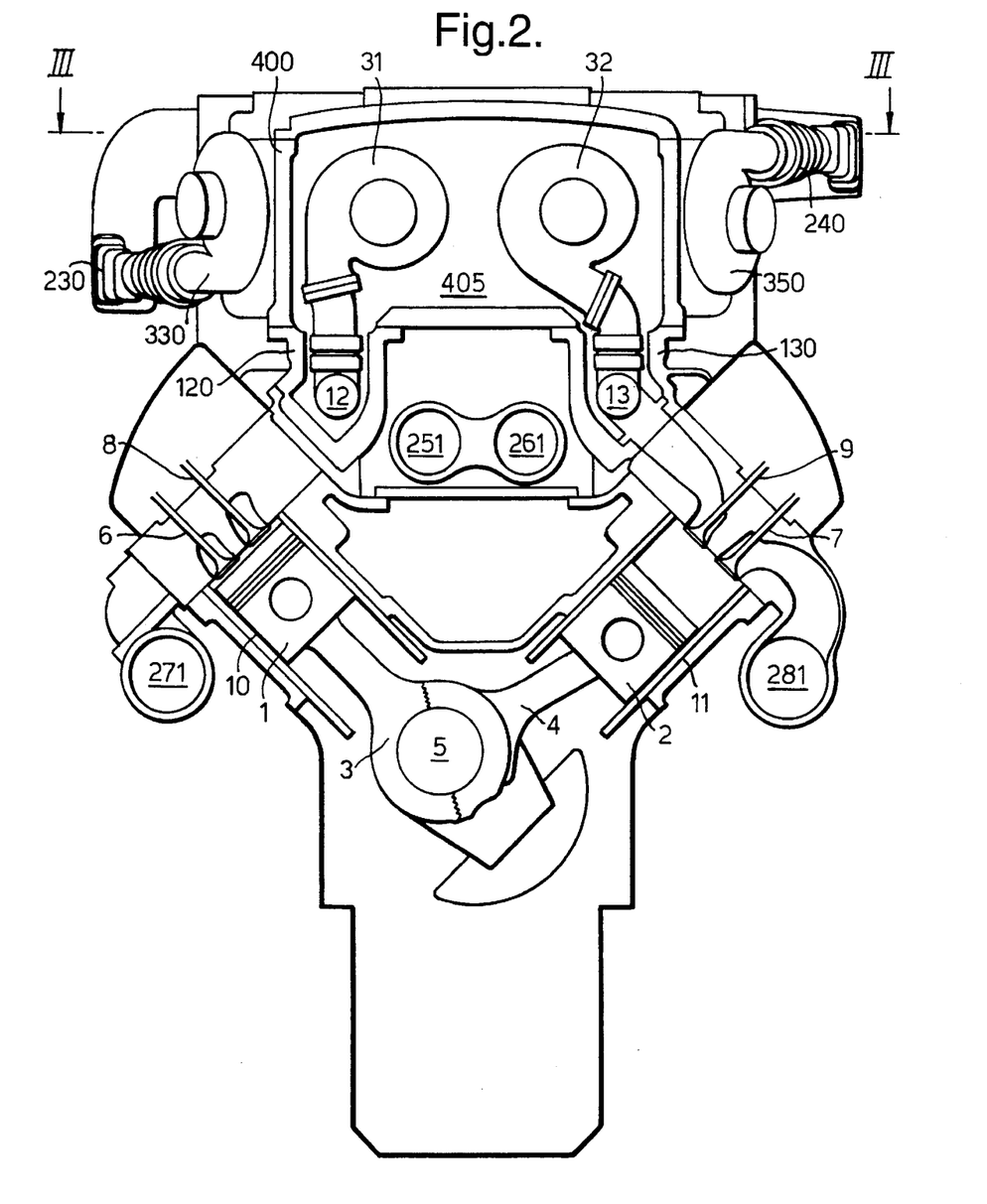
FIG. 2 shows a cross-section of FIG. 1 on II—II.

In FIG. 2 air inlets 200, 201 and their associated ducts 210, 220 have been omitted for clarity. Pistons 1, 2 are coupled via connecting rods 3, 4 to crankshaft 5 in conventional manner. Inlet valves 6, 7 allow air from inlet manifolds 271, 281 to be admitted to cylinders 10, 11 during the induction stroke of the engine. The conventional fuel injecting arrangements and valve gear have been omitted for clarity. Exhaust gas from the cylinders is led via exhaust valves 8, 9 to respective exhaust manifolds 12, 13 and thence to the inlet ports of respective high pressure turbines 31, 32. Turbines 31, 32 are mounted on the walls of enclosure 400 as will be described later. Conduits 251, 261 bring cooled air from the intercoolers to the inlets of the high pressure compressors.

The exhaust manifolds 12, 13 are surrounded by respective water cooled jackets 120, 130. The interiors of these jackets communicate with the interior 405 of the enclosure 400 such that any exhaust gas leaking from the exhaust manifold joints can escape via enclosure 400 as will be described later.

Figure 3:
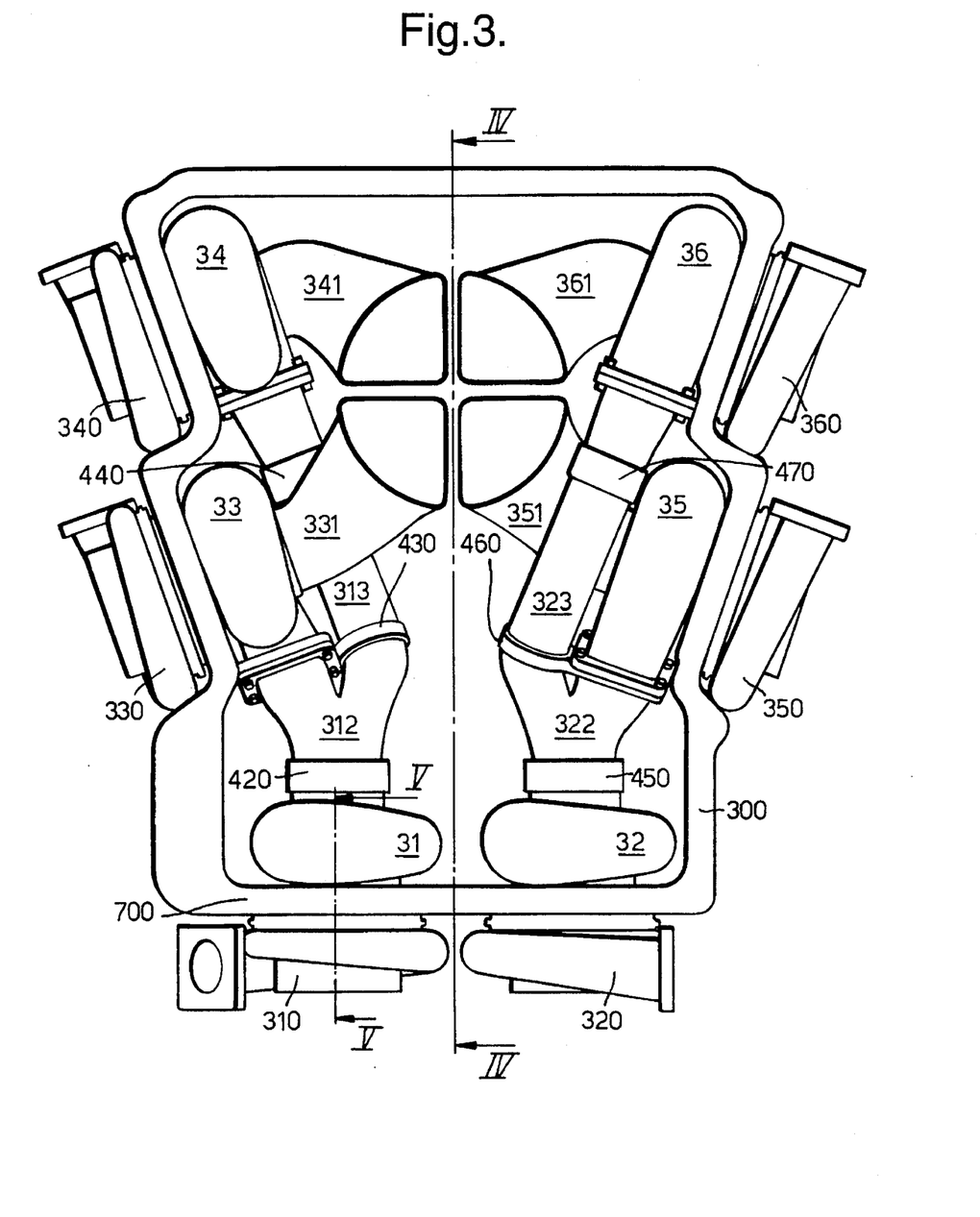
FIG. 3 shows a plan view of a turbocharger assembly of FIG. 2 on III—III.

Referring to FIG. 3, the side walls 300 of enclosure 400 are hollow to allow coolant to be passed therethrough. The high pressure compressors 310, 320 are coupled to respective high pressure turbines 31, 32, and the pairs of low pressure compressors 330, 340 and 350, 360 are coupled to respective pairs of low pressure turbines 33, 34 and 35, 36. The output ports of high pressure turbines 31, 32 are connected via conduits 312, 313 and 322, 323 to the inlet ports of low-pressure turbines 33, 34 and 35, 36. Exhaust from the outlet ports of the low pressure turbines is fed via trumpets 331, 341, 351, 361 to an exhaust pipe, not shown, as will be described later. The connections between the output ports of the high pressure turbines 31, 32 and the ducts 312, 322 are made via respective expansion joints 420, 450. Expansion joints 440, 470 and joints 430, 460 are also provided in conduits 313, 323.

Figure 4:
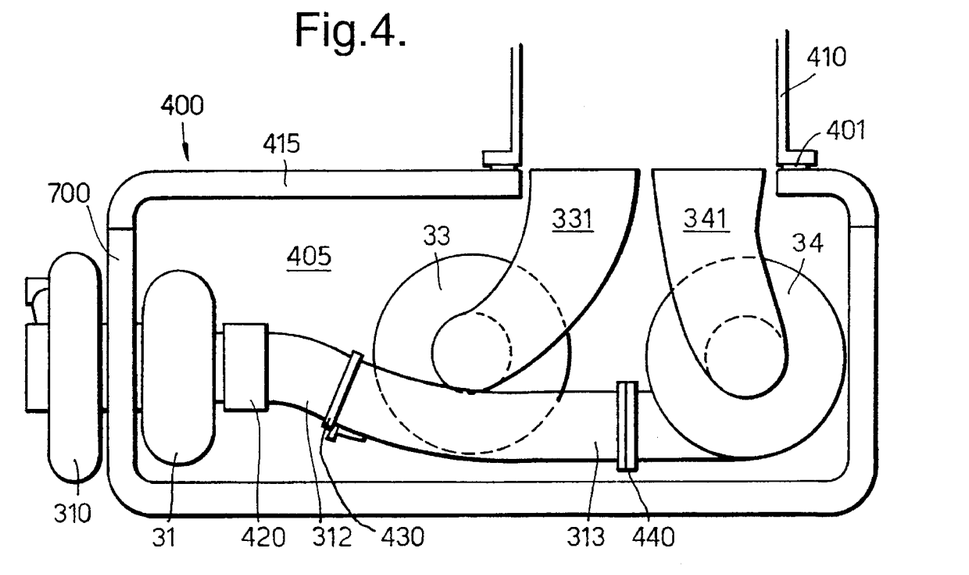
FIG. 4 shows a cross-section of FIG. 3 on IV—IV.

Referring to FIG. 4, the high pressure turbocharger 31, 310 is mounted in a wall 700 of enclosure 400 as will be described later. Trumpets 331, 341 direct exhaust gas from the low pressure turbines 33, 34 into exhaust pipe 410 but are not sealed relative to the walls of the exhaust pipe. The enclosure 400 has a lid 415. The exhaust pipe 410 is sealed relative to the lid 415 at a connection flange 401 using fasteners, not shown, such that the interior 405 of the enclosure 400 communicates with the interior of the exhaust pipe 410, and any exhaust gas leaking from joints 420, 430, 440, or from the exhaust manifold as referred to earlier, passes into the interior 405 of the housing 400 and is free to escape therefrom via the exhaust pipe 410 and does not result in pressure building up within housing 400.

The construction of the turbochargers will now be described with reference to FIGS. 5 to 9.

The turbocharger comprises four principal components. These are (a) a turbine housing 500

(b) a compressor housing 510

(c) a cartridge 600 comprising the moving parts of the turbocharger; and (d) an intermediate portion 750 of the wall 700 of the housing 400.

Figure 5:
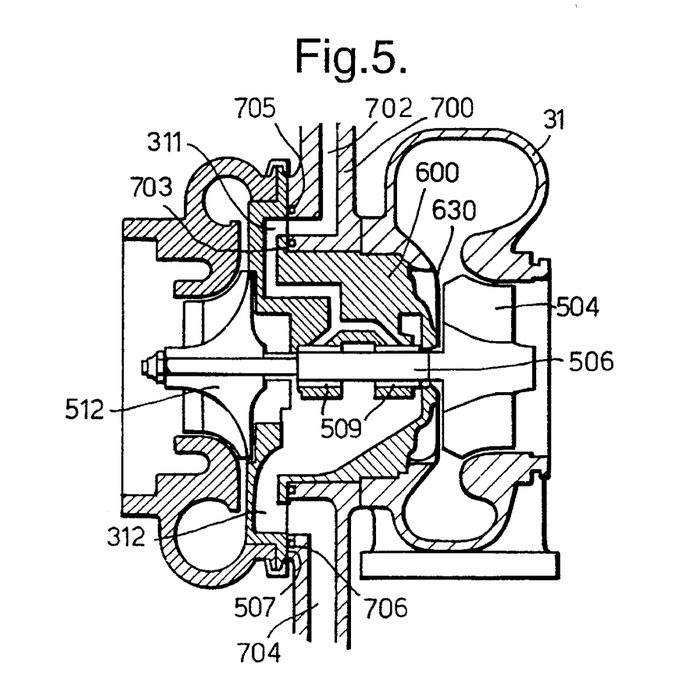
FIG. 5 shows a cross-section of FIG. 3 on V—V illustrating a turbocharger.
Figure 6:
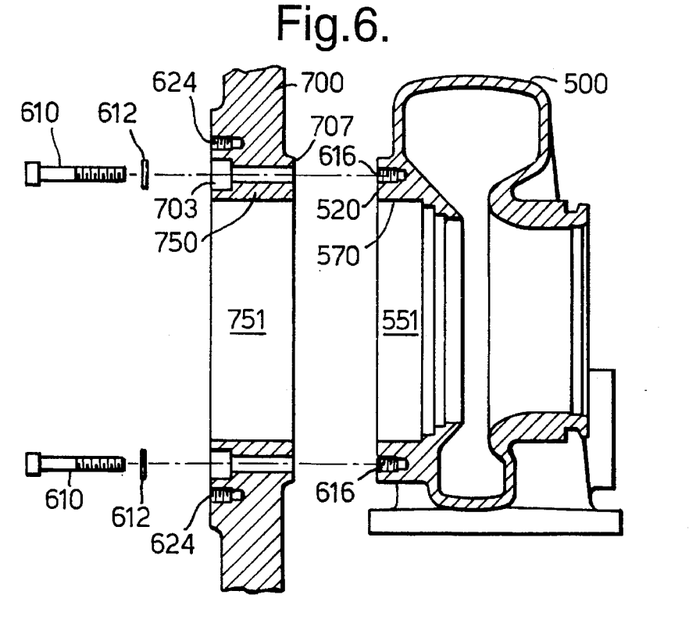
FIGS. 6 to 9 show the steps of assembling the turbocharger of FIG. 5.
Figure 7:
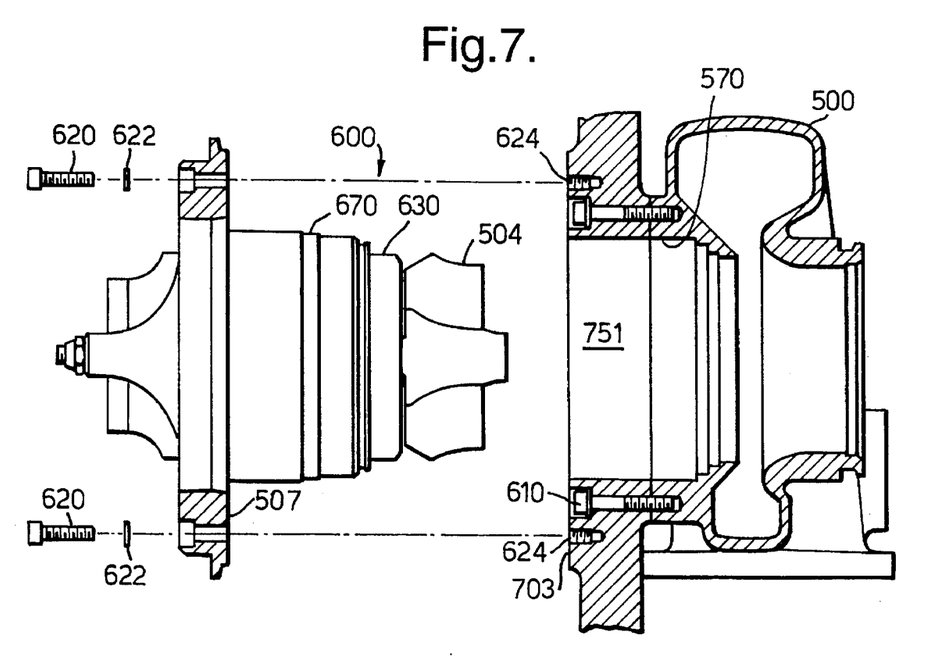

Referring to FIG. 5, the cartridge 600 comprises a compressor impeller 512 and a turbine rotor 504 mounted on a common shaft 506 running in bearings 509. The cartridge 600 has oilways 311 adapted to supply lubricating oil to the bearings 509 and an oil drain duct 312 for oil emerging from the bearings 509. The oilways 311 and duct 312 terminate in an axial face 507 of the cartridge 600. A heat shield 630 shields the bearings from hot exhaust gases in the turbine in known manner. The housing wall 700 has an oil feed conduit 702 terminating at a first face 703 of the wall 700 and arranged to communicate with the oilway 311 in the cartridge 600 when the cartridge is assembled to the first face 703 as will be described later. The wall 700 also has an oil drain duct 704 terminating at the first face 703 and arranged to communicate with the oil drain duct 312. The housing has "O" ring oil seals 705, 706 adapted to seal the oilways and oil drain.

Figure 8:
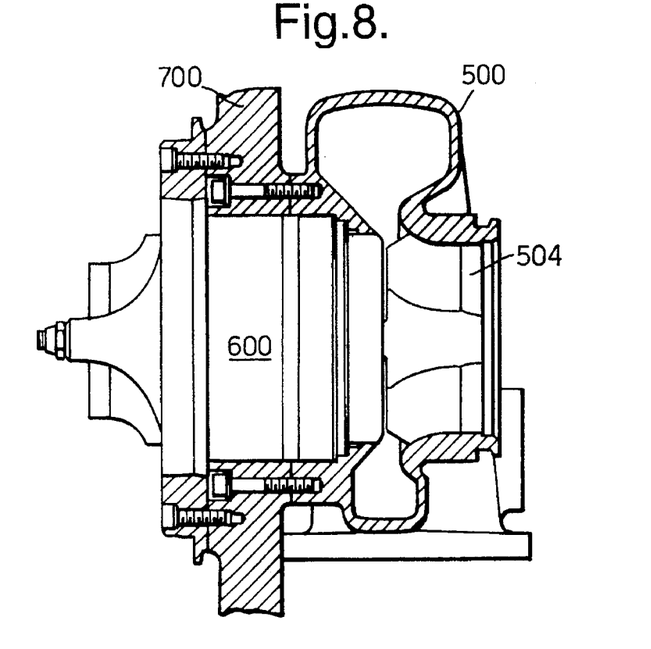

Referring to FIGS. 6–9, to assemble the turbocharger, the turbine housing 500 is aligned with a bore 751 in a support region 750 of the wall 700 using an arbor (not shown) or by making registers in the wall and the turbine housing. The turbine housing 500 is secured in position with fasteners 610 engaging tapped holes 616 in the turbine casing 500 and washers 612. On tightening the fasteners, axial face 520 of turbine casing 500, is drawn tightly against a first face 707 of region 750. The faces 520 and 707 are machined to provide a gas-tight join therebetween when the faces are drawn together. Next the cartridge 600 is inserted into the bore 751. The region 750 has a second face 703 adapted to engage with the axial face 507 of the cartridge 600. The thickness of the region 750 is such that, as shown in FIG. 8, when the face 507 engages face 703, the turbine rotor 504 is correctly disposed with respect to the turbine housing 500. The cartridge is held concentric with the turbine casing by a spigot 670 having a close fit in a narrow circular register 570 in the turbine housing 500. The cartridge 600 is secured to the second face by fasteners 620 and washers 622 which engage tapped holes 624 in the region 750 as shown in FIG. 8. On tightening the fasteners 620, the "O" ring seals 705, 706 (FIG. 5) are compressed to seal the oil feed and the oil drain connections.

Figure 9:
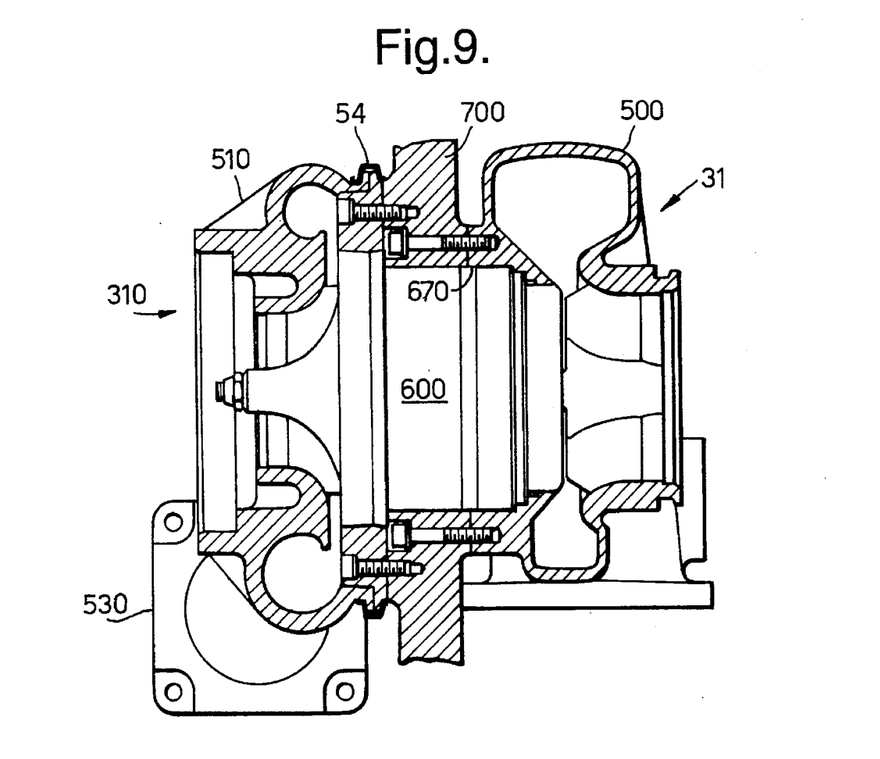

Finally the compressor housing 510 is assembled to the cartridge 600 as shown in FIG. 9, and secured in place by means of a vee-section clamping ring 54. This allows the radial orientation of the housing 510 to be adjusted so as to bring the compressor outlet port 503 to any desired position. It will be seen that, on completion of the assembly, the region 750 becomes an integrated part of the turbocharger assembly, its thickness determining the alignment of the turbine rotor relative to the turbine housing.

It can be seen that, should a turbocharger become faulty in service, to replace the cartridge 600 carrying the moving parts lit is only necessary to disconnect the air outlet 503, remove clamp 54, pull off the compressor casing 510, release the fasteners 620 and withdraw the cartridge 600. A replacement cartridge can then be refitted in the manner described previously. It is not necessary to disturb the turbine housing 500 or the exhaust conduits coupled to the turbine inlet or outlet parts, and, when the turbine is mounted in a sealed enclosure, the integrity of the sealing of the enclosure is not broken. This affords a much simpler and faster turbine servicing than the prior art arrangement referred to above in which the housing must be split and the upper part of the housing removed and then replaced and resealed to replace a faulty turbocharger.

The arrangement thus described offers a number of advantageous features. By providing two low-pressure turbochargers in series with one high pressure turbocharger, it is possible for all the turbochargers to be substantially identical.

Further, while the interior of the enclosure is at a pressure which is higher than that of the engine surroundings, this pressure is only of the order of that of the exhaust gases leaving the low pressure turbine, as gas leaking from the conduits coupled to the high pressure turbines would escape via the exhaust pipe and will not cause pressure build up within the housing. If the interior of the housing were hermetically sealed and a leak developed at the inlet of the high pressure turbocharger, then the pressure within the housing could rise to that value. Providing communication between the interior of the housing and the exhaust pipe avoids subjecting the housing to high pressures, thereby avoiding problems with sealing which might otherwise arise.

Attaching the turbine housing directly to the wall of the casing provides significant advantages in heat transfer, as much of the heat transferred from the exhaust gases to the turbine casing is diverted away from the bearings and flows directly to the wall whence it can be removed via the coolant therein. In the known turbochargers, heat from the hot turbine housing flows via that portion of the turbocharger housing intermediate the turbine and the compressor to cooler regions and, should an engine have to be suddenly shut down and as a consequence the oil pump providing forced lubrication (and cooling) of the turbocharger bearings ceases to operate, the high thermal gradient between the turbine casing (which can be at red heat) and the cooler regions can be such as to cause carbonization of the lubricating oil in the bearings.

In the turbocharger described above, the relatively narrow annular region where the spigot 670 mates with the register 570 is the only significant region where direct mechanical contact offering a low thermal resistance exists between the hot turbine casing 500 and the cartridge 600 containing the bearings. The air gap associated with the relatively loose fit between the other regions provides an increased thermal resistance to heat flow by conduction. Further, the direct connection between the turbine casing 500 and the wall 700, which, as noted may be hollow to accommodate coolant, is via mating surfaces 570 and 707 which have been machined to provide a good mechanical fit, and which therefore provide a low thermal resistance path to heat flow by conduction, which path shunts heat away from the bearings within cartridge 600.

By providing two low-pressure turbines in parallel, each handling half the volume of gas emanating from a single high pressure turbine, it is possible to arrange for the high pressure and low pressure turbines to be substantially identical. This results in economics in manufacture, and reduces the number of types of spare parts required for servicing. However, the provision of a common turbine design for both high and low pressure turbines may result in a slight reduction in energy efficiency compared with optimising the design for high and low pressure turbines individually.

Accordingly it may be advantageous in the terms of operating efficiency for the turbine housing of the high pressure turbocharger to be somewhat different from that of the low pressure turbocharger, but for a common turbine rotor to be used for both the high and low pressure turbines. This arrangement has been utilised by applicants, and was found to be advantageous in that in general, the turbine housings seldom need attention and will remain in position on the wall, while the cartridge comprising the turbine rotor and compressor impeller and associated bearings, which constitutes the moving parts of the turbocharger, is readily removable and replaceable. Such an arrangement allows a common cartridge to be used for both the high and low pressure turbochargers and provides satisfactory operational efficiency.

While Applicants found that the use of a common compressor housing and a common cartridge comprising compressor impeller and turbine rotor for both the high and low-pressure turbocharger gave satisfactory results, this is not essential. It may be that for certain applications the high-pressure turbocharger needs to be different from the low-pressure turbochargers in order to attain optimum efficiency. Such an arrangement in accordance with the invention will still offer advantages over a conventional two-stage turbocharger comprising one relatively small high-pressure and one relatively large low-pressure turbocharger, as the height of each low-pressure turbocharger will be less than that of a single low-pressure turbocharger of corresponding capacity. This reduction in height can be advantageous where an engine is to be installed in a location having limited headroom. Also, the lighter weight of the individual low-pressure turbochargers in accordance with the invention as compared with the greater weight of a single large low-pressure turbocharger facilitates removal and installation in locations where access is difficult and heavy lifting gear is not readily deployable.

We claim:

1. A supercharged internal combustion engine comprising two-stage turbocharger means in which said two-stage turbocharger means comprises a high pressure turbocharger and a plurality of low pressure turbochargers, each said turbocharger comprising a compressor and a turbine, each compressor comprising an impeller and a compressor housing having an input port and an output port, each turbine comprising a turbine rotor, and a turbine housing having an input port and an output port, and exhaust gas conduit means coupling the output port of the high pressure turbine to the input ports of the low pressure turbines in parallel for placing said output and input ports in continual communication unobstructed by valving so that the input ports of all said low pressure turbines are continually supplied with gas from the output port of said high pressure turbine under all operating conditions of the engine.

2. An engine as claimed in claim 1 further comprising air conduit means adapted to couple the output ports of the low pressure compressors in parallel to the input port of the high pressure compressor.

3. A supercharged internal combustion engine as claimed in claim 1 in which the high pressure turbocharger and the low pressure turbochargers are identical in size and configuration and individually interchangeable within said engine.

4. A supercharged internal combustion engine as claimed in claim 1 in which the respective compressor housings, compressor impellers and turbine rotors of the high pressure turbocharger and low pressure turbochargers are identical in size and configuration and individually interchangeable therebetween.

5. A supercharged internal combustion engine as claimed in claim 1 in which each turbocharger comprises a cartridge, said cartridge comprising a cartridge housing, bearings mounted in said housing, a shaft mounted in said bearings, said shaft having the compressor impeller and the turbine rotor mounted thereon, the cartridges of each of said turbochargers being identical in size and configuration and interchangeable within said engine between said turbochargers.

6. A super-charged internal combustion engine comprising two-stage turbocharger means in which said two-stage turbocharger means comprises a high pressure turbocharger and a plurality of low pressure turbochargers, each said turbocharger comprising a compressor and a turbine, each compressor comprising an impeller and a compressor housing having an input port and output port, each turbine comprising a turbine rotor, and a turbine housing having an input port and output port, and air pressure conduit means coupling the output ports of the low pressure compressors in parallel to the input port of the high pressure compressor for placing said input and output ports continually in communication unobstructed by valving so that air from the output ports of all said low pressure compressors is continually delivered to the input port of said high pressure compressor under all operating conditions of the engine.

7. A super-charged internal combustion engine as claimed in claim 1 in which the high pressure turbocharger and the low pressure turbochargers are substantially identical in size.

8. A super-charged internal combustion engine as claimed in claim 1 in which the respective compressor housing, compressor impeller and turbine rotor of the high pressure turbocharger and low pressure turbochargers are substantially identical in size.

* * * * *

UNITED STATES PATENT AND TRADEMARK OFFICE
CERTIFICATE OF CORRECTION

PATENT NO. : 5,619,854
DATED : April 15, 1997
INVENTOR(S) : John N. RAMSDEN et al.

It is certified that error appears in the above-identified patent and that said Letters Patent is hereby corrected as shown below:

Column 1, line 51, delete "it" and insert --It--. Column 3, line 33, delete "turbid" and insert --turbine--, same column, line 36, delete "the overall requirement for" and insert --of--, same column, line 37, insert the following -- the overall requirement for-- between "with" and "the". Column 7, line 33, delete "lit" and insert "it".

Signed and Sealed this

Second Day of September, 1997

BRUCE LEHMAN

Attest:

Attesting Officer

Commissioner of Patents and Trademarks